United States Patent
Stuart

(10) Patent No.: US 7,139,400 B2
(45) Date of Patent: Nov. 21, 2006

(54) MICROPHONE CALIBRATION FOR ACTIVE NOISE CONTROL SYSTEM

(75) Inventor: Philip Edward Arthur Stuart, Chatham (CA)

(73) Assignee: Siemens VDO Automotive, Inc., Chatham (CA)

(*) Notice: Subject to any disclaimer, the term of this patent is extended or adjusted under 35 U.S.C. 154(b) by 199 days.

(21) Appl. No.: 10/406,964

(22) Filed: Apr. 4, 2003

(65) Prior Publication Data

US 2003/0198354 A1    Oct. 23, 2003

Related U.S. Application Data

(60) Provisional application No. 60/374,395, filed on Apr. 22, 2002.

(51) Int. Cl.
H03B 29/00      (2006.01)

(52) U.S. Cl. .................................. 381/71.4; 381/71.8

(58) Field of Classification Search ............... 381/71.1, 381/71.4, 71.9, 71.8, 56, 58, 59
See application file for complete search history.

(56) References Cited

U.S. PATENT DOCUMENTS

| | | | | |
|---|---|---|---|---|
| 5,426,703 A * | 6/1995 | Hamabe et al. | ........... | 381/71.12 |
| 5,499,302 A * | 3/1996 | Nagami et al. | ........... | 381/71.4 |
| 5,517,571 A * | 5/1996 | Saruta et al. | ........... | 381/71.11 |
| 5,651,072 A * | 7/1997 | Nakao et al. | ........... | 381/71.2 |
| 6,914,989 B1 * | 7/2005 | Janse et al. | ........... | 381/92 |
| 2002/0146136 A1 * | 10/2002 | Carter | ........... | 381/59 |

* cited by examiner

Primary Examiner—Brian T. Pendleton

(57) ABSTRACT

An active noise control system (100) and method compensates for changes in a microphone output to maintain accurate noise control. A calibration signal reflecting a desired microphone output is generated and stored in an active noise control module (106). During operation, the active noise control module (106) compares an actual microphone output signal with the calibration signal and compensates for any changes in the actual output signal before any noise compensation or cancellation function occurs.

16 Claims, 2 Drawing Sheets

MICROPHONE CALIBRATION FOR ACTIVE NOISE CONTROL SYSTEM

REFERENCE TO RELATED APPLICATIONS

This application claims the benefit of U.S. Provisional Appln. No. 60/374,395, filed Apr. 22, 2002.

TECHNICAL FIELD

The present invention is directed to active noise control systems, and more particularly to a method and system for calibrating a microphone in an active noise control system.

BACKGROUND OF THE INVENTION

Vehicle manufacturers have employed active and passive methods to reduce engine noise within the passenger compartment. Noise frequently emanates from the engine, travels through the air induction system and passes out of the mouth of the air intake into the passenger compartment. Efforts have been made to reduce the amount of engine noise traveling through the air induction system. These efforts include the use of both passive devices, such as expansion chambers, and active devices involving anti-noise generators.

Active noise control systems use a speaker that outputs a generated sound, or "antinoise," through a speaker to attenuate engine noise. The generated anti-noise is out of phase with the engine noise and combines with the engine noise to reduce the overall noise level from the engine. Generally, this sound is generated in proximity to the air induction system. The resultant mix of engine noise and anti-noise is captured and measured by the microphone, and the output of the microphone is used to determine what the generated anti-noise should be. In short, active noise control is conducted via a feedback loop.

Because the microphone must operate in a hostile environment over many years, the output of the microphone for a given engine noise pattern may change. The engine noise level itself, however, does not change over time. Dirt, humidity, and other environmental factors may all cause the microphone to lose sensitivity and therefore output an incorrect signal for generating the anti-noise. Other system components, such as speakers that output the anti-noise, may also be adversely affected by environmental factors.

There is a desire for a method and system that is not affected by changes in the microphone in generating an accurate anti-noise signal for effective noise cancellation.

SUMMARY OF THE INVENTION

The present invention is directed to an active noise control method and system that controls engine noise even if a microphone in the system changes calibration over time. In one embodiment, an active noise control module in the system stores a calibration signal reflecting the microphone output for a predetermined noise input. During system operation, the calibration signal is compared with the actual output of the microphone. If the microphone output is different than the calibration signal due to, for example, changes in the microphone's sensitivity over time, the active noise control module adjusts its anti-noise signal output so that the anti-noise ultimately generated by the system will keep the total engine noise at a constant, desired level despite the change in the microphone's sensitivity.

By using the active noise control module itself to compensate for changes in the microphone's sensitivity over time, the invention can maintain a desired level of engine noise cancellation without requiring a separate calibration sub-system.

DETAILED DESCRIPTION OF THE EMBODIMENTS

Figure 1:
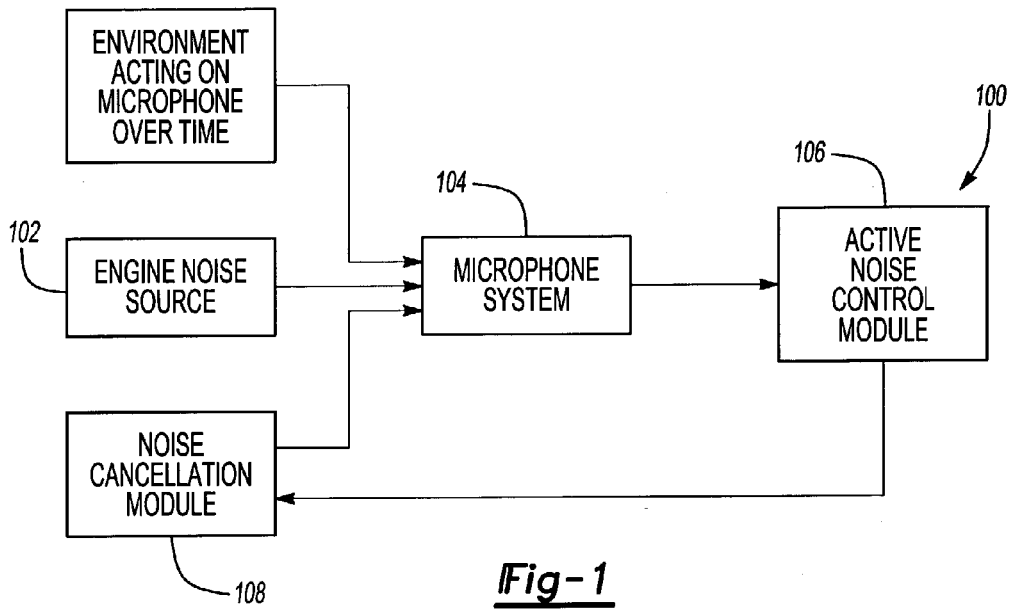
FIG. 1 is a block diagram illustrating an active noise control system according to one embodiment of the invention.

FIG. 1 is a block diagram of an active noise control system 100 according to one embodiment of the invention. An engine 102 generates noise to be controlled by the active noise control system 100. The system 100 itself has a microphone 104 that captures the generated noise, an active noise control module 106 that generates a noise control signal, and a noise cancellation module 108 that generates a sound field of anti-noise that cancels out at least a portion of the noise detected by the microphone 104. The noise cancellation module 108 contains, for example, a speaker that outputs anti-noise that is out of phase with the noise generated by the engine 102. Mixing the engine noise and the anti-noise together attenuates the engine noise by a desired amount. As shown in FIG. 1, the microphone 104 output controls the active noise control module 106; more particularly, the active noise control module 106 generates its output signal based on the microphone 104 output. Thus, when the microphone 104 output is used, the active noise control module 106 output changes, thereby changing the noise generated by the noise cancellation module 108.

Figure 2A:
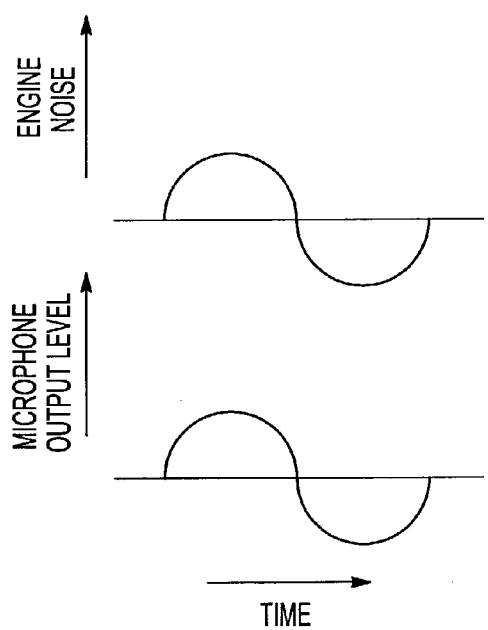
FIG. 2 illustrates a change in microphone output over time.
Figure 2B:
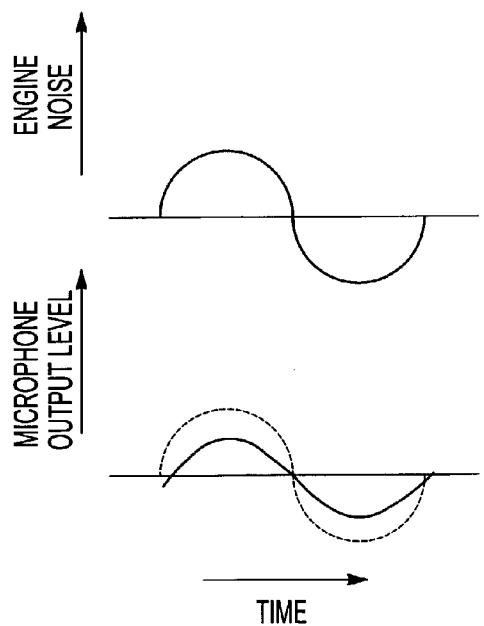

FIGS. 2A and 2B illustrate the deteriorating effect that the operating environment may have on the microphone 104. When the microphone 104 is relatively new, the output of the microphone 104 level accurately reflects the engine noise, as shown in FIG. 2A. Over time, however, the microphone 104 will output a signal having a different output level for the same engine noise, as shown in FIG. 2B, due to decreased sensitivity in the microphone 104. For example, exposure to extreme heat and cold as well as particulate matter may cause the microphone 104 to be less sensitive to engine noise and therefore generate an output that incorrectly indicates that the engine noise is lower than it actually is. This false microphone output, if left unchecked, will cause the anti-noise output by the noise cancellation module 108 to change as well, making it less effective in attenuating the engine noise in the desired manner. For example, if the microphone 104 output indicates that the noise level of the engine 102 is lower than it actually is, the noise output by the noise cancellation module 108 will attenuate less than a desired portion of the engine noise.

Figure 3:
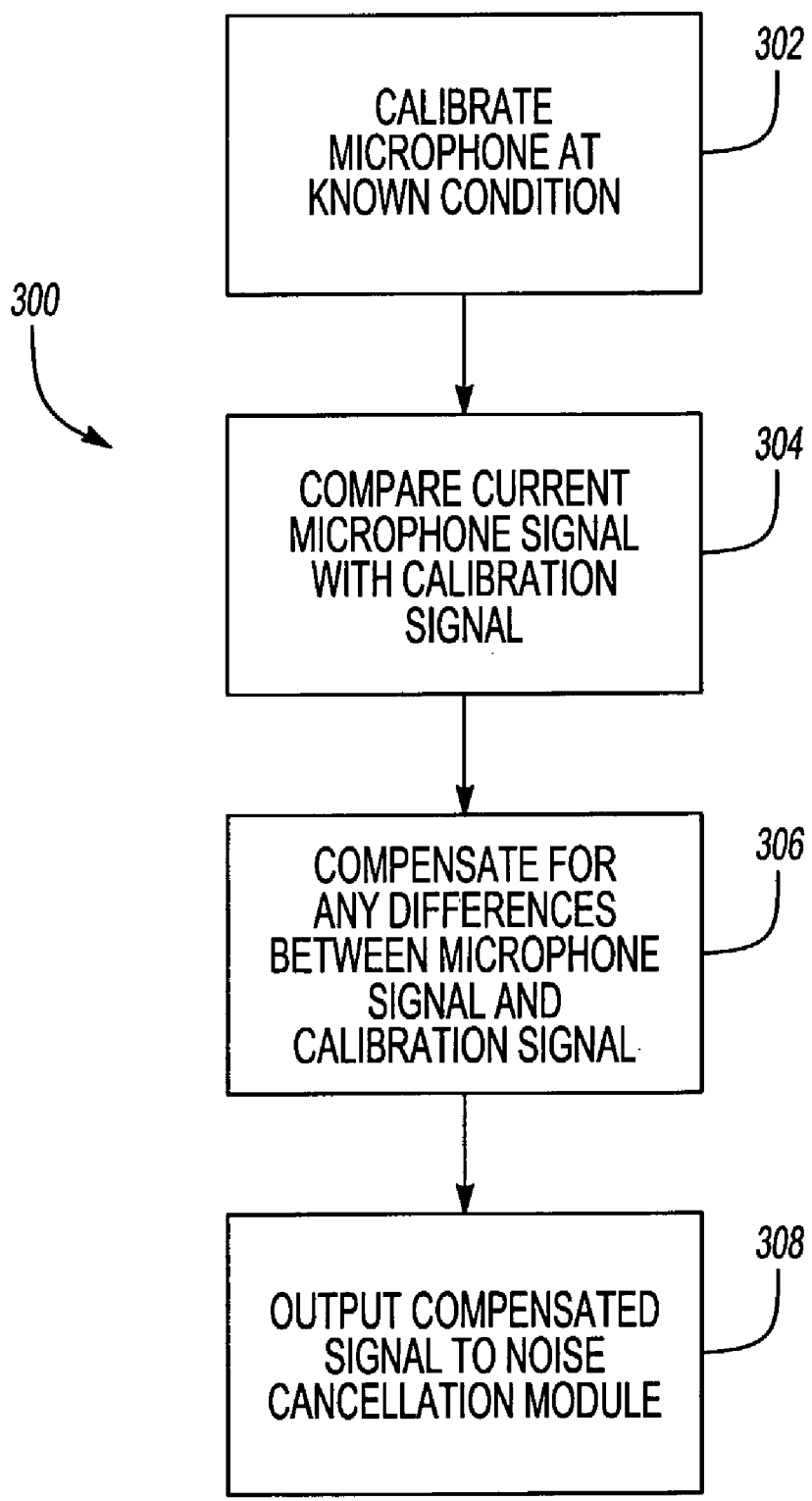
FIG. 3 is a flow diagram illustrating a method for microphone calibration according to one embodiment of the invention.

FIG. 3 is a flow diagram illustrating one method 300 in which the inventive system 100 can adjust for changes in microphone performance. In one embodiment, the microphone 104 can be calibrated using a known noise source (e.g., the engine 102) at pre-determined conditions (block 302). The microphone output signal generated during calibration is stored in the active noise control module 106 as a calibration signal for future reference.

Possible pre-determined conditions include any absolute noise characteristic (i.e., a noise characteristic that purely reflects the engine noise, with no anti-noise or other outside noise mixed in), such as a known engine noise spectrum and/or absolute noise levels at certain frequencies. During the calibration step (block 302), preferably no anti-noise is allowed in the calibration environment. This ensures that the absolute level and spectrum of noise generated by the engine 102 is accurately detected by the microphone 104 while it is calibrated. The absolute level of noise is needed if, for example, a customer wishes to keep a certain level of engine noise having a particular frequency spectrum; in this case, the microphone 104 is calibrated so that the calibration signal causes the active noise control module 106 to instruct the noise cancellation module 108 to output an absolute sound level. Regardless of the specific way the microphone 104 is calibrated, the calibration step (block 302) provides a benchmark of microphone performance before environmental effects have changed the microphone's performance.

During system operation, the signal actually generated by the microphone 104 at a given time is compared by the active noise control module 106 with the stored calibration signal. If the two signals match, which will likely happen if the microphone is relatively new, the active noise control module 106 will not need to conduct any compensation process before outputting an anti-noise signal to the noise cancellation module 108. The noise cancellation module 108 then outputs anti-noise based on the anti-noise signal output from the active noise control module 106. As shown in FIG. 1, the system 100 forms a feedback loop where the microphone 104 monitors the mixture of the engine noise 102 and the anti-noise from the noise cancellation module 108, allowing the system 100 to continuously adjust the active noise control module 106 output as needed.

Extended exposure to harsh environmental conditions may cause the microphone 104 output to change, as noted above. If the active noise control module 106 detects that the microphone output 104 has drifted from the calibration signal, the active noise control module 106 compensates for this drift based on the difference between the actual microphone output and the stored calibration signal (block 306). In one embodiment, the active noise control module 106 determines a compensation factor and adds this compensation factor to the microphone output before generating the anti-noise signal based on the combined compensation factor and microphone output.

Adjusting the anti-noise signal based on the actual calibration state of the microphone 104 ensures that any deterioration in other components of the system 100 is also compensated. For example, if the anti-noise signal output from the active noise control module 106 is generated on the assumption that the noise cancellation module 108 is fully operational, and if the actual amount of anti-noise from the noise cancellation module 108 fails to control the engine noise in the desired manner due to deterioration in the noise cancellation module 108, the mixture of the anti-noise and the engine noise will still contain residual undesired noise and deviate from the desired noise. The microphone 104 will pick up this deviation and generate a corresponding output, causing the active noise control module 106 to conduct further compensation based on the stored calibration signal.

After the active noise control module 106 compensates for changes in the microphone 104 based on the calibration signal, it outputs the compensated signal to the active noise control module 106 for generating the noise cancellation signal (block 308).

By compensating for changes in the microphone output, the method 300 can continue to generate noise that effectively cancels the engine noise even if the microphone output changes. Because the engine noise signature stays relatively constant over the life of the vehicle, the calibration signal generated by the invention provides an accurate benchmark for optimizing engine noise control. Further, by using the active noise control module 106 to conduct noise control and maintain microphone calibration, any changes in the microphone's performance can be compensated without requiring any separate subsystem for generating the calibration signal.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An active noise control method, comprising:
   generating a saved calibration signal corresponding to a first microphone output during a known engine noise condition;
   storing the calibration signal in an active noise control module, wherein the active noise control module generates an anti-noise;
   comparing the calibration signal with an actual microphone output corresponding to the known engine noise condition;
   adjusting the microphone output based on the comparing step; and
   generating the anti-noise corresponding to the adjusted microphone output to control a detected noise.

2. The method of claim 1, wherein the step of generating the calibration signal comprises setting the calibration signal so that the and-noise will cancel the detected noise in at least one of a predetermined frequency spectrum and a predetermined noise level.

3. The method of claim 1, wherein the known noise condition during the generating step represents an absolute noise characteristic generated by a noise source.

4. An active noise control method, comprising:
   generating a saved calibration signal corresponding to a first microphone output during a known engine noise condition;
   storing the calibration signal in an active noise control module, wherein the active noise control module generates an anti-noise;
   comparing the calibration signal with an actual microphone output corresponding to the known engine noise condition;
   adjusting the microphone output based on the comparing step, including determining a difference between the actual microphone output and the calibration signal, calculating a compensation factor based on the determined difference, and adding the compensation factor to the actual microphone output; and
   generating the anti-noise corresponding to the adjusted microphone output to control a detected noise.

5. The method of claim 1, wherein the anti-noise controls the detected noise by mixing with the detected noise to generate a new detected noise.

6. The method of claim 5, further comprising repeating the comparing and adjusting steps, wherein a second microphone output corresponds to the new detected noise.

7. An active noise control method for a vehicle engine, comprising:
generating a calibration signal corresponding to a first microphone output corresponding to an absolute noise characteristic generated by the vehicle engine, where the absolute noise characteristic comprises a known engine noise condition without noise attenuation;
storing the calibration signal in an active noise control module, wherein the active noise control module generates an anti-noise signal;
comparing the calibration signal with an actual microphone output corresponding to a detected engine noise;
determining a difference between the actual microphone output and the calibration signal;
calculating a compensation factor based on the determined difference;
adding the compensation factor to the actual microphone output to adjust the anti-noise signal; and
generating an anti-noise corresponding to the anti-noise signal, wherein the anti-noise mixes with the detected engine noise to generate a new detected engine noise.

8. The method of claim 7, wherein the step of generating the calibration signal comprises setting the calibration signal so that the anti-noise signal will cancel the detected engine noise in at least one of a predetermined frequency spectrum and a predetermined noise level.

9. The method of claim 7, further comprising repeating the comparing, determining, calculating, adding and generating steps during engine operation.

10. An active noise control system for controlling noise from a vehicle engine, comprising:
a microphone that detects a detected engine noise from a vehicle engine and generates a microphone output based on the detected engine noise;
an active noise control module that generates an anti-noise signal, the active noise control module having a memory that stores a calibration signal corresponding to a first microphone output during a known noise condition representing an absolute noise characteristic generated by the vehicle engine, and a processor that compares the calibration signal with an actual microphone output corresponding to a detected engine noise and adjusts the anti-noise signal based on the comparison; and
a noise cancellation module that receives the anti-noise signal from the active noise control module and outputs an anti-noise corresponding to the anti-noise signal, wherein the anti-noise mixes with the detected engine noise to generate a new detected engine noise.

11. The system of claim 10, wherein the noise cancellation module comprises a speaker that outputs the anti-noise.

12. The method as recited in claim 1 wherein step of generating a saved calibration signal comprises excluding any anti-noise such that only the known engine noise is utilized for the saved calibration signal.

13. The method as recited in claim 1 wherein said known engine noise is generated by an engine of a vehicle.

14. The method as recited in claim 1 wherein said known engine noise condition is generated by a noise attenuation speaker.

15. The system as recited in claim 10 where the known noise condition representing the absolute noise characteristic generated by the vehicle engine comprises engine noise only without anti-noise.

16. The system as recited in claim 10 where the calibration signal includes only noise generated by the engine prior to generation of any anti-noise.

* * * * *